Dec. 4, 1956  W. M. HARRISON  2,772,695
MIXING VALVES
Filed March 1, 1952  2 Sheets-Sheet 2
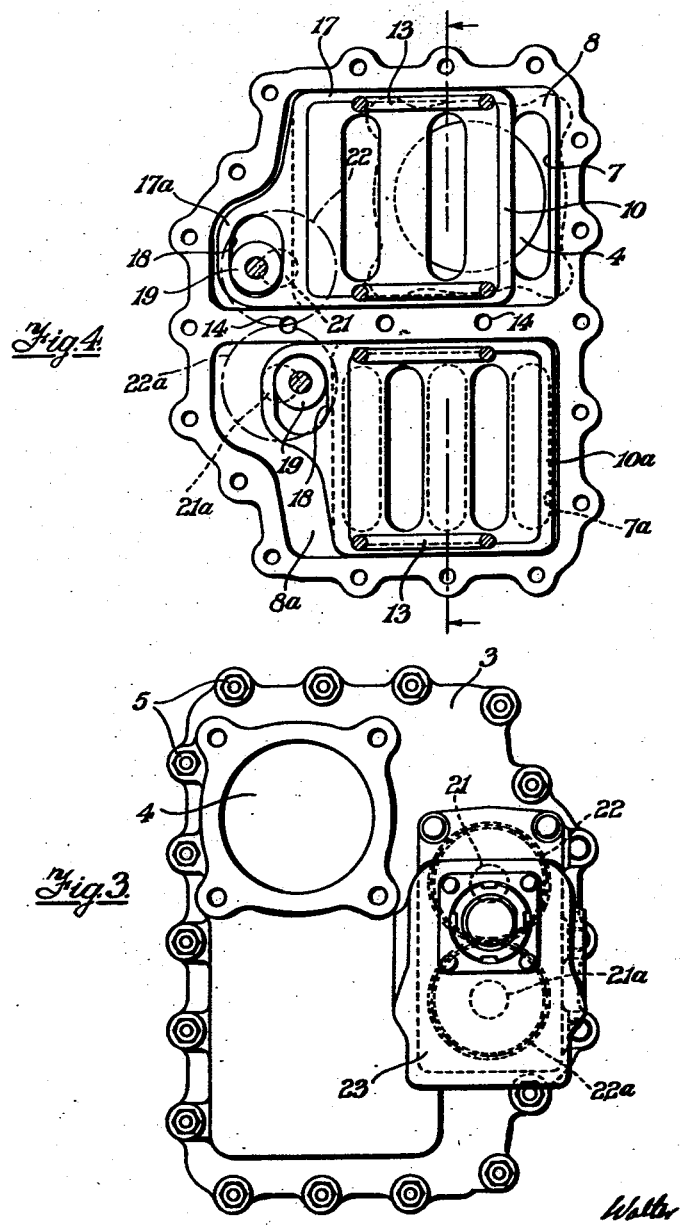
INVENTOR
Walter M. Harrison
BY
Truman P. Beaman
ATTORNEY

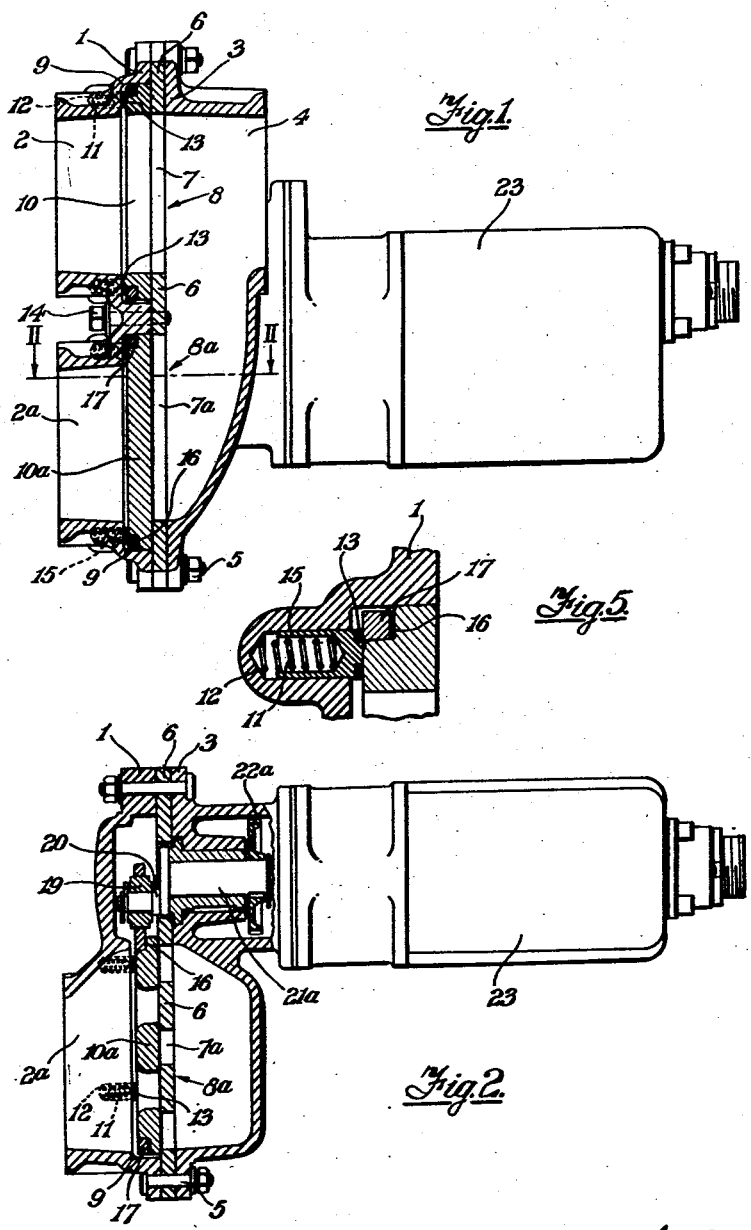

United States Patent Office 2,772,695
Patented Dec. 4, 1956

2,772,695

MIXING VALVES

Walter Mostyn Harrison, Cefn Coed, near Merthyr Tydfil, South Wales, assignor to Teddington Aircraft Controls Limited, Cefn Coed, Wales Application March 1, 1952, Serial No. 274,411

Claims priority, application Great Britain March 20, 1951

1 Claim. (Cl. 137—625.4)

This invention relates to valves for effecting a controlled admixture of two air or other gas streams and more particularly to valves of the kind comprising a housing embodying two inlet ports or passages leading into a common manifold or outlet, and valve means for varying the relative rates of fluid flow through said inlet ports.

The object of the present invention is to provide an improved construction and arrangement which will operate efficiently even when dealing with air or gas streams at comparatively high temperatures and pressures and which, where the two gas streams are at substantially different pressures, will prevent leakage from one inlet passage to the other when the valve means is in a position to close one passage completely.

According to the invention each inlet port or passage is provided with fluid flow regulating valve means consisting of a fixed metal grid structure extending across the port and a transversely movable grid-like gate member which is formed of carbon or other self lubricating material and which slides upon and co-operates with the metal grid, the actuating means of the two gates being interconnected in such manner that the gates move in unison but in opposite respect, that is movement of either gate in the direction to close the related port is accompanied by an equivalent movement of the other gate towards the fully open position.

In the preferred form of the invention a compact arrangement is obtained by arranging the two inlet ports side by side and forming the two fixed grid structures in a common plate extending across said ports, the movable gates being disposed in separate pockets on the inlet side of the fixed grids and being spring-pressed into engagement therewith.

Reference will now be made to the accompanying drawings which illustrate by way of example an embodiment of the invention which has been designed particularly for providing a controlled admixture of hot and cooled air for use in an air conditioning system although the valve has other uses. In the drawings Fig. 1 is a sectional elevation through the valve, Fig. 2 is a sectional plan on the line II—II of Fig. 1, Fig. 3 is an end view, Fig. 4 is an end view with one half of the housing removed, and Fig. 5 is a detail view to an enlarged scale showing one form of the spring loading means for the movable gates.

As shown, the valve housing consists of a casting 1 embodying two side by side inlet ports or passages 2, 2a and a second casting 3 embodying an outlet port 4, said castings being preferably formed of aluminum or other light metal and being adapted to be bolted together as indicated at 5. Clamped between the two castings is a metal plate 6 formed with two series of slots 7, 7a which provide fixed grid structures 8, 8a across the inlet ports 2, 2a respectively. Located in recesses 9 formed in the casting 1 adjacent each of the fixed grid structures 8, 8a is a sliding gate 10, 10a respectively, these gates being formed of carbon or other self-lubricating material and being also of a grid-like structure with the spacing and depth of the slots such that in one limit position of a gate its slots are aligned with the bars of the fixed grid to close the associated port completely whilst in the other limit position of said gate its slots are aligned with the slots in the fixed grid to permit substantially unobstructed gas flow through the associated port. In Figs. 1 and 4 the gates 10a and 10 are shown respectively in the two limit positions above mentioned.

To ensure smooth sliding movement of the gates and an effective sealing of a gas flow passage, when the associated gas is in the passage closing position the gates are guided at their edges by the sides of the recesses 9 in the housing 1 and they are spring loaded by a series of compression springs 11 located in pockets 12 in the casting 1 and acting upon strips or runners 13, preferably of stainless steel, said springs serving to press the gates into close engagement with the fixed grids 8, 8a. In addition, leakage between the two recesses 9 is prevented by the provision of a series of bolts 14 serving to clamp the mid-section of the plate 6 firmly upon the central rib-like portion of the casting 1 which separates the said recesses.

The springs 11 may be loosely accommodated in the pockets 12 and bear directly upon the runners 13 or the arrangement shown in Fig. 5 may be employed. In this form, the springs are located in tubular plungers 15 which have a sliding fit in the pockets 12 and are secured at their outer ends to the runners, this arrangement having the advantage that it dispenses with the need of providing any additional means for retaining the runners in position.

To actuate the gates, each gate is rebated around its edges as shown at 16 and fits within a frame-like actuating member 17, the latter having an extension 17a which is slotted as at 18 to receive a roller 19 mounted on a crank 20 fast with an operating shaft 21 or 21a. To secure the synchronised but reverse movements of the two gates, the operating shafts 21, 21a carry intermeshing gears 22, 22a respectively and by reference to Fig. 4 it will be seen that an anti-clockwise movement of the shaft 21a through 180° will slide the gate 10a from the fully closed position to the fully open position and also, through gearing 22, 22a, will rotate shaft 21 a corresponding amount but in a clockwise direction to slide the gate 10 from the fully open position to the fully closed position. Movement of the gates to any intermediate positions will thus produce a proportionate gas flow through the two inlet ports. In the drawings, the shaft 21a is shown actuated directly by an electric motor 23 but it may be driven by any other power means or be hand actuated if desired, whilst the gearing 22, 22a may be substituted by linkage or any known equivalent means which will provide the desired opposed movement of the two gates.

It will be seen that the invention provides a mixing valve which will enable the two gas streams to be accurately controlled and admixed in any desired proportions whilst covering the full range of adjustment with only a relatively small movement of the gate members, the actual extent of this movement being dependent upon the number and width of the slots in the fixed grid structures and the gates.

I claim:

In valve structure for effecting a controlled admixture of fluids, housing structure defining two side-by-side fluid inlets and an outlet common to said inlets, said housing also including a common manifold chamber to which said outlet delivers fluid delivered from said inlets, said housing including internal recesses, slotted grid structure, means fixedly mounting said grid structure in said housing to form a partition between said inlets and said outlet, said housing recesses being located on one side of said partition, a pair of slotted gates of self-lubricating material, means mounting said gates for rectilinear guided motion in said housing recesses with the gates located against one side of said partition, actuator means for gates including frames embracing said gates for effecting simultaneous sliding movement thereof in opposite directions, said frames having extension portions having slots defined therein, driver means disposed in said slots for actuating said frames and gates, rotatable driven means upon which said drivers are eccentrically mounted for simultaneously actuating said frames and gates with sliding movement in opposite directions, said housing having internal pockets located adjacent said recesses, said gates having edge portions guided in said recesses and springs in said pockets acting against said edge portions for sealing said gates against said grid.

References Cited in the file of this patent

UNITED STATES PATENTS

| | | |
|---|---|---|
| 68,692 | Blakes | Sept. 10, 1867 |
| 824,585 | Rieth | June 26, 1906 |
| 1,192,141 | White | July 25, 1916 |
| 1,790,168 | Paul | Jan. 27, 1931 |
| 1,854,918 | Adams | Apr. 19, 1932 |
| 2,145,133 | Riney | Jan. 24, 1939 |
| 2,296,917 | Garrett | Sept. 29, 1942 |
| 2,601,231 | Smith | June 24, 1952 |
| 2,641,871 | Ray | June 16, 1953 |

FOREIGN PATENTS

| | | |
|---|---|---|
| 722,410 | France | Dec. 29, 1931 |